(12) United States Patent
Raman et al.

(10) Patent No.: US 12,104,522 B1
(45) Date of Patent: Oct. 1, 2024

(54) MARINE ENGINE SYSTEMS AND METHODS FOR OPERATING THE SAME

(71) Applicant: Saudi Arabian Oil Company, Dhahran (SA)

(72) Inventors: Vallinayagam Raman, Dhahran (SA); Junseok Chang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 40 days.

(21) Appl. No.: 18/193,024

(22) Filed: Mar. 30, 2023

(51) Int. Cl.
| | |
|---|---|
| *F02B 61/04* | (2006.01) |
| *F02B 37/04* | (2006.01) |
| *F02B 43/10* | (2006.01) |
| *F02D 41/00* | (2006.01) |
| *F02M 25/00* | (2006.01) |

(Continued)

(52) U.S. Cl.
CPC .............. *F02B 61/04* (2013.01); *F02B 37/04* (2013.01); *F02B 43/10* (2013.01); *F02D 41/0007* (2013.01); *F02M 25/00* (2013.01); *F02M 25/12* (2013.01); *F02M 25/14* (2013.01);
(Continued)

(58) Field of Classification Search
CPC ........ F02B 37/00; F02B 37/04; F02B 37/164; F02B 43/10; F02B 61/04; F02M 25/00; F02M 25/12; F02M 25/14; F02M 35/10157; Y02T 10/12; F02D 41/0002; F02D 41/0007; B01D 2257/404; C01B 2210/0046
See application file for complete search history.

(56) References Cited

U.S. PATENT DOCUMENTS

| 229,841 A | 7/1880 | Rinehart et al. |
|---|---|---|
| 5,459,994 A | 10/1995 | Drnevich |

(Continued)

FOREIGN PATENT DOCUMENTS

| FR | 2926607 A1 * | 7/2009 | ............ B01D 53/22 |
|---|---|---|---|
| WO | 0015951 A1 | 3/2000 | |

(Continued)

OTHER PUBLICATIONS

Notification of Transmittal of the International Search Report and the Written Opinion of the International Searching Authority, or the Declaration dated Jun. 12, 2024 pertaining to International application No. PCT/US2024/020661 filed Mar. 20, 2024, pp. 1-12.

*Primary Examiner* — Loren C Edwards
(74) *Attorney, Agent, or Firm* — Dinsmore & Shohl LLP

(57) ABSTRACT

A marine engine system includes a marine engine, a turbocharger comprising a compressor, an air valve positioned in a flow path connecting the compressor and a mixing chamber to split flow between an intake air stream and a recovered air stream directed to a separation unit, an air operated compressor to generate a separator feed stream by increasing the pressure of the recovered air stream, the separation unit configured to concentrate nitrogen from the separator feed stream to generate a nitrogen-enriched air stream and a nitrogen-depleted air stream, a mixing chamber to combine the nitrogen-enriched air stream and the intake air stream to generate a nitrogen-enriched intake air stream, and a controller communicatively coupled to the air valve to direct the air valve to variably adjust the split between the intake air stream and the recovered air stream.

21 Claims, 7 Drawing Sheets

(51) Int. Cl.
*F02M 25/12* (2006.01)
*F02M 25/14* (2006.01)
*F02M 35/10* (2006.01)
*F02B 37/16* (2006.01)

(52) U.S. Cl.
CPC ..... *F02M 35/10157* (2013.01); *F02B 37/164* (2013.01); *Y02T 10/12* (2013.01)

(56) References Cited

U.S. PATENT DOCUMENTS

| | | | |
|---|---|---|---|
| 5,649,517 A * | 7/1997 | Poola | B01D 53/22 |
| | | | 123/585 |
| 6,516,787 B1 * | 2/2003 | Dutart | F02M 25/12 |
| | | | 123/568.17 |
| 6,939,517 B2 | 9/2005 | Ooe et al. | |
| 7,128,064 B2 | 10/2006 | Heider | |
| 7,588,612 B2 | 9/2009 | Marwitz et al. | |
| 2004/0050095 A1 | 3/2004 | Bringham et al. | |
| 2022/0034268 A1 | 2/2022 | Raman et al. | |

FOREIGN PATENT DOCUMENTS

| | | |
|---|---|---|
| WO | 2004015347 A2 | 2/2004 |
| WO | 2008115073 A1 | 9/2008 |
| WO | 2013176413 A1 | 11/2013 |

* cited by examiner

MARINE ENGINE SYSTEMS AND METHODS FOR OPERATING THE SAME

FIELD

The present disclosure relates to internal combustion marine engine systems including membrane based nitrogen generation and methods for operating the same.

TECHNICAL BACKGROUND

In recent years, various jurisdictions have implemented regulations and agreements to reduce pollutants emitted by engines that use petroleum-based fuels. For example, the International Maritime Organization (IMO) has implemented regulations that relate to marine engine emissions, limiting the emission of pollutants such as sulfur oxides (SOx), nitrogen oxides (NOx), and the like.

BRIEF SUMMARY

Heavy fuel oil, sometimes referred to as bunker fuel or residual fuel oil, may be utilized in many marine engine applications. While efforts are being made to reduce sulfur content in heavy fuel oil such as the IMO 2020 initiative put in place in January of 2020, heavy fuel oil includes a high sulfur content as compared to other fuels. When heavy fuel oil is combusted, the combustion may emit increased amounts of SOx as compared to other fuels because of the comparatively high sulfur content.

The IMO, as well as other conventions and regulations include emissions mandates that are becoming increasingly restrictive over time, and these conventions present an ongoing challenge to limit SOx emissions and NOx emissions within mandated ranges, particularly in applications that utilize heavy fuel oil. For example, at the time of this disclosure, the Tier 3 IMO NOx regulation is currently in place that mandates an 80% reduction in NOx emission when compared to Tier 1 standards that were applied in January of 2000. The limit for NOx emissions based on the IMO International Convention for the Prevention of Pollution from Ships (MARPOL) Annex VI regulation 13 are, at the time of this disclosure, as follows: Tier 1 (11.3 grams per kilowatt-hour (g/kWh)), Tier 2 (8.9 g/k Wh), and Tier 3 (2.2 g/kWh). While Tier 3 NOx regulations are effective in the North American and U.S. Caribbean Sea Emission Control Areas (ECAs) as of 2016, the full-fledged adaptation of Tier 3 NOx regulation is yet to be realized as of the time of this disclosure.

Although emissions mandates with respect to NOx are increasingly restrictive, the comparatively high sulfur content of heavy fuel oil may limit the availability of some NOx emission reduction strategies. For example, the comparatively high sulfur content of heavy fuel oil may be incompatible with exhaust gas recirculation (EGR) systems. Moreover, strategies that are available for use with heavy fuel oil, such as selective catalytic reduction (SCR), may be costly and present other technical challenges, such as ammonia slip.

Accordingly, a need exists for improved marine engine systems and methods for operating marine engine systems that are suitable for use with heavy fuel oil fuels. Embodiments of the present disclosure are directed to marine engine systems that include a separation unit that separates nitrogen from air, forming a nitrogen-enriched air stream. The nitrogen-enriched air stream may be passed to a combustion chamber, mixed with fuel, and combusted. The nitrogen-enriched air stream may increase a nitrogen content by volume in the combustion chamber as compared to conventional configurations, thereby reducing the oxygen content by volume in the combustion chamber as compared to conventional configurations. By increasing the nitrogen content and reducing the oxygen content in the combustion chamber, a temperature of the combustion can be reduced, thereby reducing the production of NOx. In this way, marine engine systems according to the present disclosure may have reduced emissions, even while utilizing heavy fuel oil. Further, the marine engine systems of the present disclosure generate the nitrogen-enriched air stream utilizing excess compressed air generated during standard operation of the marine engine to reduce the cost and power demands for generating the nitrogen-enriched air stream used in emissions reduction.

According to one or more embodiments, a marine engine system comprises a marine engine comprising a combustion chamber configured for burning heavy fuel oil; a turbocharger comprising a compressor with an air inlet and a compressed air outlet, a turbine, and a shaft coupled to the compressor and the turbine, the turbine provided in an exhaust path of exhaust gases from the marine engine such that the turbine rotates the shaft which in turn rotates the compressor; a separation unit comprising one or more membranes that are structurally configured to concentrate nitrogen from a separator feed stream feed to generate a nitrogen-enriched air stream and a nitrogen-depleted air stream; an air valve positioned in a flow path exiting the compressor, wherein the air valve is variably positionable to split flow between an intake air stream and a recovered air stream; a mixing chamber with inlets in communication with the separation unit to receive the nitrogen-enriched air stream and the air valve to receive the intake air stream and an outlet in communication with the combustion chamber of the marine engine for providing a nitrogen-enriched intake air stream to the combustion chamber, wherein the nitrogen-enriched intake air stream is a formed from the combination of the nitrogen-enriched air stream and the intake air stream; an air operated compressor positioned in a recovery flow path connecting the air valve and the separation unit to receive the recovered air stream and generate a separator feed stream, the air operated compressor configured to increase the pressure of the recovered air stream with air drawn off from the recovered air stream driving the air operated compressor; and an air flow controller communicatively coupled to the air valve, the air flow controller comprising a processor and a computer readable and executable instruction set, which when executed, causes the processor to: determine a baseline total mass air flow rate to the marine engine based on a load on the marine engine; determine a valve position of the air valve to split flow between the intake air stream and the recovered air stream such that the nitrogen-enriched intake air stream is provided at a target nitrogen concentration to the combustion chamber of the marine engine and at the baseline total mass air flow rate; and direct the air valve to adjust to the determined valve position.

According to one or more further embodiments, a method for operating a marine engine system comprises passing air to a compressor of a turbocharger to form a compressed air stream, the turbocharger comprising the compressor, a turbine, and a shaft coupled to the compressor and the turbine, the turbine provided in an exhaust path of exhaust gases from a marine engine such that the turbine rotates the shaft which in turn rotates the compressor; splitting the compressed air stream exiting the compressor with an air valve positioned in a flow path exiting the compressor, wherein the air valve is variably positionable to split flow between an intake air stream directed to a mixing chamber and a recovered air stream directed to a separation unit; passing the recovered air stream to an air operated compressor positioned in a recovery flow path connecting the air valve and the separation unit to generate a separator feed stream, the air operated compressor configured to increase the pressure of the air in the recovered air stream with air drawn off from the recovered air stream driving the air operated compressor; separating the separator feed stream in the separation unit into a nitrogen-enriched air stream and a nitrogen-depleted air stream, wherein the separation unit comprises one or more membranes that are structurally configured to generate the nitrogen-enriched air stream having a greater nitrogen concentration that the separator feed stream; passing the intake air stream to the mixing chamber; passing the nitrogen-enriched air stream to the mixing chamber; mixing the intake air stream and the nitrogen-enriched air stream within the mixing chamber to generate a nitrogen-enriched intake air stream; determining a baseline total mass air flow rate to the marine engine based on a load on the marine engine; adjusting the air valve to adjust the split between the intake air stream and the recovered air stream such that the nitrogen-enriched intake air stream is provided at a target nitrogen concentration and the baseline total mass air flow rate to a combustion chamber of the marine engine; passing a heavy fuel oil to the combustion chamber; and combusting the heavy fuel oil and the nitrogen-enriched intake air stream within the combustion chamber, thereby moving a piston within the combustion chamber.

Additional features and advantages of the technology disclosed in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
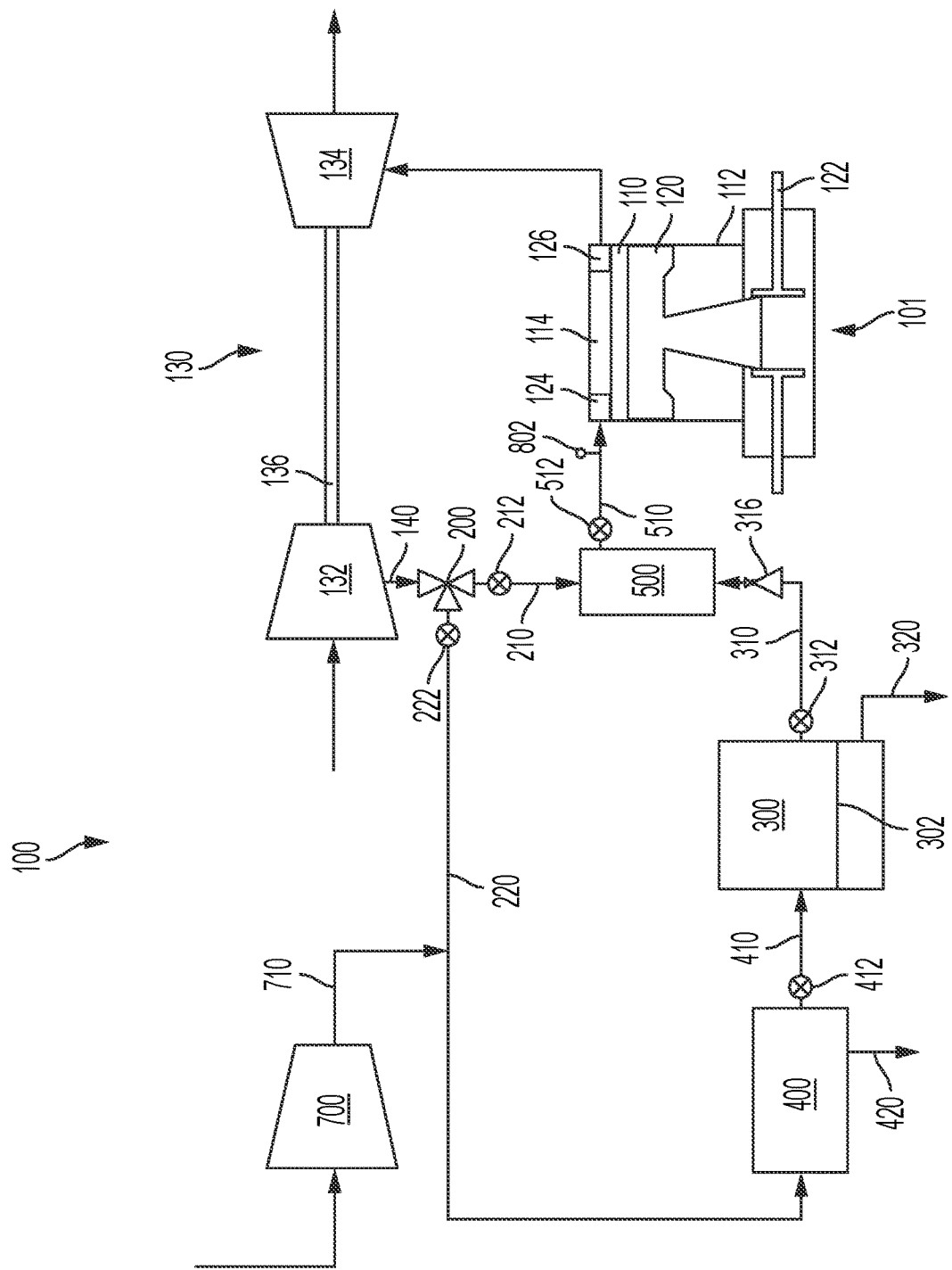
FIG. 1 schematically depicts a marine engine system with supplemental compressed air provided to an air operated compressor, according to one or more embodiments shown and described herein.

For the purpose of describing the simplified schematic illustrations and descriptions of FIGS. 1-6, the numerous valves, temperature sensors, electronic controllers and the like that may be employed and well known to those of ordinary skill with fluid and gas piping are not included. It should be understood that these components are within the spirit and scope of the present embodiments disclosed. Operational components, such as those described in the present disclosure, may be added to the various embodiments described in this disclosure.

It should further be noted that arrows in the drawings refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed or utilized in other shipboard applications. System inlet streams may be streams transferred from other shipboard systems or may be non-processed feedstock streams.

It should be understood that two or more process streams are "mixed" or "combined" when two or more lines intersect in the schematic flow diagrams of FIGS. 1-6. Mixing or combining may also include mixing by directly introducing both streams into a like vessel, separation device, or other system component. For example, it should be understood that when two streams are depicted as being combined directly prior to entering a system component such as a separation unit, that in some embodiments the streams could equivalently be introduced into the system component separately and be mixed within the system component.

Reference will now be made in greater detail to various embodiments, some embodiments of which are illustrated in the accompanying drawings. Whenever possible, the same reference numerals will be used throughout the drawings to refer to the same or similar parts, process streams, or system components.

DETAILED DESCRIPTION

Embodiments of the present disclosure are directed to internal combustion marines engine systems that include a separation unit that separates nitrogen from pressurized air drawn off of compressed air exiting a turbocharger, forming a nitrogen-enriched air stream. The nitrogen-enriched air stream is combined with the remainder of the pressurized air exiting the turbocharger, passed to a combustion chamber, mixed with a fuel of heavy fuel oil, and combusted. The nitrogen-enriched air stream generally increases the nitrogen content in the combustion chamber during combustion, as compared to traditional configurations with direct injection of atmospheric air. By increasing the nitrogen content in the combustion chamber during combustion and accordingly decreasing an oxygen content by volume in the combustion chamber, a temperature of the combustion can be reduced as compared to configurations having a lower nitrogen content. By lowering the temperature of combustion, the production of NOx is reduced as compared to configurations having a higher combustion temperature. As such, internal combustion marine engine systems according to the present disclosure may have reduced emissions, such as reduced NOx, as compared to conventional configurations even while utilizing heavy fuel oil.

The marine engine system 100 typically includes a marine engine 101, a turbocharger 130 comprising a compressor 132, a mixing chamber 500, a separation unit 300, an air valve 200 positioned in a flow path connecting the compressor 132 and the mixing chamber 500, an air operated compressor 400 positioned in a recovery flow path connecting the air valve 200 and the separation unit 300, and an air flow controller 600 communicatively coupled to the air valve 200. The marine engine 101 comprises a combustion chamber 110 configured for burning heavy fuel oil. The turbocharger 130 includes the compressor 132 having an air inlet and a compressed air outlet, a turbine 134, and a shaft 136 coupled to the compressor 132 and the turbine 134. Further, the turbine 134 is provided in an exhaust path of exhaust gases from the marine engine 101 such that the turbine 134 rotates the shaft 136 which in turn rotates the compressor 132. The air valve 200 is variably positionable to split flow between an intake air stream 210 directed to the mixing chamber 500 and a recovered air stream 220 directed to the separation unit 300. The air operated compressor 400 generates a separator feed stream 410 and is configured to increase the pressure of the recovered air stream 220 with air drawn off from the recovered air stream 220 driving the air operated compressor 400. The separation unit 300 comprises one or more membranes 302 that are structurally configured to concentrate nitrogen from the separator feed stream 410 to generate a nitrogen-enriched air stream 310 and a nitrogen-depleted air stream 320. The mixing chamber 500 includes inlets in communication with the separation unit 300 to receive the nitrogen-enriched air stream 310 and the air valve 200 to receive the intake air stream 210 and an outlet in communication with the combustion chamber 110 of the marine engine 101 for providing a nitrogen-enriched intake air stream 510 to the combustion chamber 110. Finally, the air flow controller 600 comprises a processor 602 and a computer readable and executable instruction set, which when executed, causes the processor 602 to determine a baseline total mass air flow rate to the marine engine 101 based on a load on the marine engine 101, determine a valve position of the air valve 200 to split flow between the intake air stream 210 and the recovered air stream 220 such that the nitrogen-enriched intake air stream 510 is provided at a target nitrogen concentration to the combustion chamber 110 of the marine engine 101 and at the baseline total mass air flow rate; and direct the air valve 200 to adjust to the determined valve position. These components of the marine engine system 100 and various other embodiments will now be described in further detail with reference to the appended drawings.

With reference to FIGS. 1 through 6, the marine engine system 100 includes a marine engine 101 powered by combustion or burning of heavy fuel oil. For purposes of the present disclosure, heavy fuel oil is defined as a marine fuel in accordance with ISO 8217 (2017 revision)—Petroleum products—Fuels (class F)—Specifications of marine fuels. In one or more particular embodiments, the heavy fuel oil aligns with residual fuels as defined in ISO 8217. The marine engine 101 includes a cylinder head 114 engaged with a block that defines one or more sidewalls 112 engaged with the cylinder head 114. In embodiments, a piston 120 is engaged with the one or more sidewalls 112. The piston 120, the cylinder head 114, and the one or more sidewalls 112 at least partially define the combustion chamber 110, and fuel may be combusted within the combustion chamber 110. In embodiments, the piston 120 is movable along the one or more sidewalls 112 toward and away from the cylinder head 114, for example, as fuel is combusted within the combustion chamber 110. While in the view depicted in FIGS. 1 through 6 a single combustion chamber 110 is depicted, it should be understood that the marine engine 101 may include any suitable number of combustion chambers 110 in any suitable orientation with respect to one another. Further, while in the various figures the combustion chamber 110 is depicted as being defined by the cylinder head 114, the one or more sidewalls 112, and the piston 120, it should be understood that this is merely an example, and the marine engine 101 may have any suitable combustion chamber 110. For example, in some applications, the combustion chamber 110 may be defined by a crankcase and a piston that rotates within the crankcase such as in a rotary engine configuration. Selection of an appropriate style of marine engine 101 for a particular application or watercraft is within the purview of one skilled in the art.

In one or more embodiments, the piston 120 is coupled to a crankshaft 122. For example, as depicted in the various figures, the piston 120 may be coupled to the crankshaft 122 through a connecting rod, and in operation, linear movement of the piston 120 along the one or more sidewalls 112 is converted into rotational movement of the crankshaft 122. Further, as the marine engine 101 typically powers a marine vessel, the crankshaft 122 may rotate a propeller or the like that provides the vessel with mobility.

In one or more embodiments, the combustion chamber 110 is in selective communication with an intake manifold 124 and an exhaust manifold 126. The intake manifold 124 may include any suitable manifold through which intake gas is passed into the combustion chamber 110. In embodiments, the exhaust manifold 126 may include any suitable manifold through which exhaust gases such as combustion by-products from the combustion chamber 110 are passed after fuel is combusted within the combustion chamber 110. In embodiments in which the marine engine 101 includes multiple combustion chambers, the intake manifold 124, the exhaust manifold 126, or both may be in selective communication with the multiple combustion chambers.

In some embodiments, the marine engine 101 may be in selective communication with the intake manifold 124 through one or more intake valves, and may be in selective communication with the exhaust manifold 126 through one or more exhaust valves. The intake valves and the exhaust valves may each be positionable between an open position and a closed position, and can each be moved between the open position and the closed position by any suitable device, such as and without limitation, a cam shaft, a hydraulic actuator, an electromagnetic actuator, a pneumatic actuator, or the like.

The marine engine system 100 further includes the turbocharger 130. The turbocharger 130 includes the compressor 132, the turbine 134, and the shaft 136 coupled to the compressor 132 and the turbine 134. The turbine 134 may rotate, for example as the result of exhaust gas being passed through the turbine 134, as described in greater detail herein. As the turbine 134 rotates, the turbine 134 rotates the shaft 136, which in turn rotates the compressor 132. As the compressor 132 rotates, the compressor 132 may compress air pulled in from the surrounding atmosphere that is then passed to the air valve 200 for routing within the marine engine system 100.

The marine engine system 100 further includes the air valve 200 positioned in the flow path connecting the compressor 132 and the mixing chamber 500. The air valve 200 is variably positionable to split flow between the intake air stream 210 directed to the mixing chamber 500 and the recovered air stream 220 directed to the separation unit 300. Controlling the split of flow of the compressed air provided from the compressor 132 between the intake air stream 210 and the recovered air stream 220 allows for the entirety of the compressed air from the compressor 132 to be advantageously utilized. Specifically, as the marine engine system 100 utilizes an increased nitrogen content in the air fed to the combustion chamber 110, air with an enhanced nitrogen content must be added to atmospheric air before providing the combined stream to the combustion chamber 110. However, the addition of such additional stream of air with an enhanced nitrogen content means an excess of air would be provided to the marine engine 101, thus requiring a portion to be bled off. The air valve 200 allows the excess compressed air to instead be recovered as the recovered air stream 220 and effectively utilized in the pre-compressed state to generate stream of air with an enhanced nitrogen content. Such integration allows for an overall reduced size and expense for generation of nitrogen rich air and operation of the marine engine system 100.

The air valve 200 is variably positionable allowing for varying fractions of the compressed air stream 140 provided from the compressor 132 to be send to the mixing chamber 500 and the separation unit 300. That is, the air valve 200 may be adjusted to withdraw any fraction of the compressed air stream 140 for provision to the separation unit 300 instead of to the mixing chamber 500. In various embodiments, the air valve 200 may be positioned such that 1 to 50 volume percent (vol. %), 1 to 25 vol. %, 1 to 20 vol. %, 5 to 40 vol. %, 5 to 30 vol. %, 10 to 25 vol. %, 12 to 21 vol. %, or 15 to 18 vol. % of the compressed air stream 140 from the compressor 132 is directed to the recovered air stream 220.

The marine engine system 100 further includes the separation unit 300. The separation unit 300, in embodiments, is structurally configured to preferentially separate nitrogen from air. Specifically, the separation unit comprises one or more membranes 302 which are structurally configured to concentrate nitrogen from the separator feed stream 410 to generate the nitrogen-enriched air stream 310 and the nitrogen-depleted air stream 320. In some embodiments, the one or more membranes 302 may selectively allow oxygen or other gases to pass through the one or more membranes 302, while restricting the nitrogen from passing through the one or more membranes 302. Restricting flow of nitrogen from passing through the one or more membranes 302 while allowing oxygen or other gases to pass through the one or more membranes 302 results in a concentrating of nitrogen in the nitrogen-enriched air stream 310. Essentially gases other than nitrogen are removed from the separator feed stream 410 resulting in a stream having lesser total flow rate but a higher concentration of nitrogen. It will be appreciated that the one or more membranes 302 may operate in the reverse manner with nitrogen passing through the one or more membranes 302 and oxygen or other gases being preferentially restricted from passage through the one or more membranes 302. The one or more membranes 302 may include any suitable membranes to separate nitrogen from air, and may include, for example and without limitation, hollow fiber membranes, flat sheet membranes, or the like.

The separator feed stream 410 is typically provided to the separation unit 300 at an elevated pressure for the one or more membranes 302 to achieve efficient separation of the separator feed stream 410 into the nitrogen-enriched air stream 310 and the nitrogen-depleted air stream 320. Specifically, as the pressure of the feed to the separation unit 300 is increased the rate of separation and the air recover rate are both increased. Further, as a pressure drop occurs across the separation unit 300, the separator feed stream 410 is desirably provided to the separation unit 300 at a sufficient pressure that re-pressurization is not required before passage to the combustion chamber 110 of the marine engine 101. In various embodiments, the separator feed stream 410 is provided to the separation unit 300 at a pressure of 8 bar to 15 bar, 9 bar to 12 bar, 10 bar to 12 bar, 11 bar to 12 bar, approximately 11 bar, or approximately 12 bar. As such, the pressure of the recovered air stream 220 may be increased with the air operated compressor 400 positioned in the recovery flow path connecting the air valve 200 and the separation unit 300. Details and operation of the air operated compressor 400 is provided infra.

In one or more embodiments, the one or more membranes 302 utilized in the separation unit 300 may have a membrane purity of 85% to 95%. Specifically, the nitrogen-enriched air stream 310 exiting the separation unit 300 may have a nitrogen concentration of 85 vol. % to 95 vol. % in contrast to the concentration of nitrogen in atmospheric air of 79 vol. %. When the nitrogen-enriched air stream 310 exiting the separation unit 300 is mixed with atmospheric air, the final concentration of air provided to the intake manifold 124 may be 81 vol. % to 85 vol. % in one or more embodiments. It will be appreciated that the molar concentration of air aligns with the concentration based on volume given the volume of 1 mole of gas at standard temperature and pressure is always 22.4 liters (1). In various further embodiments, the one or more membranes 302 utilized in the separation unit 300 may have a membrane purity of 85% to 92%, 88% to 95%, 90% to 95%, 88% to 92%, 90% to 92%, or approximately 90%. Various membrane purities from 90% to 99% were explored. It was unexpectantly determined that for power savings a membrane purity according to the range presently disclosed provided enhanced benefits over a greater purity membrane. In addition to power savings, cost and weight savings are also provided with a membrane purity according to the range presently disclosed.

Consideration of the membrane purity of the one or more membranes 302 is intimately interwoven with the advancements achieved with the marine engine system 100. Manufacturers of membranes for nitrogen separation produce membranes for different applications with differing purity or air flow demands. It will be appreciated that total air recovery rate and nitrogen production capacity are competing parameters where the total air recovery rate is diminished as the nitrogen concentration in the output stream is increased. The parameters are a result of a limited supply of nitrogen in atmospheric feed air and limitations on perfect separation through a membrane. It has been determined that for a 90% membrane purity the air recovery rate is approximately 70%, for a 95% membrane purity the air recovery rate is approximately 50%, and for a 99% membrane purity the air recovery rate is approximately 33%.

For a goal of enriching the nitrogen content of a total of 2.4 kilograms per second (kg/s) air fed to combustion chamber 110 by 2%, the flow of the nitrogen-enriched air stream 310 required for 99%, 95% and 90% membrane modules are 0.2 kg/s, 0.3 kg/s and 0.4 kg/s, respectively. Since the air recovery rate is higher for a 90% membrane purity, for the same feed air flow, greater flow of the nitrogen-enriched air stream 310 is produced. The flow of the nitrogen-enriched air stream 310 when provided to the mixing chamber 500 displaces an equivalent amount of air provided from the compressor 132. As the marine engine system 100 ingeniously rerouted the displaced air with the air valve 200 to be utilized as a feed to the separation unit 300, the power demand on any external compressors is reduced. Since 90% membrane purity produces a greater flow in the nitrogen-enriched air stream 310, the utilization of displaced air is more, which helps to save more power. That is, counter-intuitively, providing a flow of the nitrogen-enriched air stream 310 with a lesser nitrogen purity allows for greater power savings as a result of more compressed air from the compressors 132 being able to be advantageously utilized in the separation unit 300.

Utilization of one or more membranes 302 in the separation unit 300 with less nitrogen purity also, counter intuitively, allows the total number of membrane modules to be reduced. For example, commercially available membranes from GENERON (Houston, Texas), such as the 7200 CP membrane module, with 99%, 95% and 90% purity are able to generate flows of 106.8 Normal Meter Cubed per Hour ($Nm^3/hr$), 256 $Nm^3/hr$ and 486 $Nm^3/hr$. respectively. Since the production capacity of 90% purity membranes is greater, the number of membrane modules required is decreased, which reduces the cost.

In one or more embodiments, the nitrogen-depleted air stream 320 may be vented to atmosphere, for example, through a check valve 322. In one or more embodiments, the check valve 322 may include any suitable one-way valve that allows the nitrogen-depleted air stream 320 to pass from the separation unit 300 through the check valve 322, while restricting the flow of gas through the check valve 322 back into the separation unit 300.

The marine engine system 100 further includes the air operated compressor 400. The air operated compressor 400 is positioned in the recovery flow path connecting the air valve 200 and the separation unit 300 to generate the separator feed stream 410. The air operated compressor 400 is configured to increase the pressure of the recovered air stream 220 with air drawn off from the recovered air stream 220 driving the air operated compressor 400. As such, external power is not required to operate the air operated compressor 400 with the pressurized feed stream to the air operated compressor 400 providing the entire energy input for pressurization.

The air operated compressor 400 operates as a completely mechanical unit driven by air. Specifically, the air operated compressor 400 has an internal mechanism with a reciprocating piston through which the pressure of the separator feed stream 410 exiting the air operated compressor 400 is twice the pressure of the recovered air stream 220 at the inlet of the air operated compressor 400. A continuous flow of the recovered air stream 220 operates the air operated compressor 400 with the flow rate of the recovered air stream 220 being approximately 1.2 times the flow rate of the separator feed stream 410 provided at the outlet of the air operated compressor 400. The difference in the flow rates of the recovered air stream 220 and the separator feed stream 410 results from the air drawn off from the recovered air stream 220 to operate the air operated compressor 400. The air utilized to operate the air operated compressor 400 is vented as air operated compressor exhaust stream 420.

In various embodiments, the air operated compressor 400 increases the pressure of the recovered air stream 220 such that the separator feed stream 410 has a pressure 1.1 to 2.0 times, 1.3 to 2.0 times, 1.5 to 2.0 times, 1.7 to 2.0 times, or 1.8 to 2.0 times the pressure of the recovered air stream 220.

As the air operated compressor 400 increases the pressure of the inlet flow in the outlet flow from the air operated compressor 400 up to double the pressure of the inlet stream, the recovered air stream 220 should be provided to the air operated compressor 400 at least at approximately half the pressure desired for the separator feed stream 410. In various embodiments, the separator feed stream 410 is provided to the separation unit 300 at a pressure of 8 bar to 15 bar, 9 bar to 12 bar, 10 bar to 12 bar, 11 bar to 12 bar, approximately 11 bar, or approximately 12 bar which corresponds to a desired feed pressure for the recovered air stream 220 to the air operated compressor 400 with a doubling of the pressure of 4 bar to 7.5 bar, 4.5 bar to 6 bar, 5 bar to 6 bar, 5.5 bar to 6 bar, approximately 5.5 bar, or approximately 6 bar respectively. As a typical feed of intake air to a marine engine is approximately 5.5 bar, the compressed air generated by the compressors 132 is typically at a pressure of 5.5 bar, thus a feed pressure of 5.5 bar allows for the recovered air stream 220 to be provided at a pressure of 5.5 bar without adjustment.

In one or more embodiments, the air operated compressor 400 operates with inlet air passing through a check valve to pressure boosting chambers A and B. Meanwhile, air is supplied to actuating chamber B via a governor and a switching valve. Then, the air from actuating chamber B and pressure boosting chamber A are applied to a piston, boosting the air in pressure boosting chamber B. As the piston travels, the boosted air is pushed via the check valve out the air operated compressor 400. When the piston reaches to the end, the piston causes the switching valve to switch so that actuating chamber B is in the exhaust state and actuating chamber A is in the supply. Then, the piston reverses its movement, this time, the pressures from pressure boosting chamber B and actuating chamber A boosts the air in pressure boosting chamber A and sends it via the check valve out the air operated compressor 400. The process described above is repeated to continuously supply highly pressurized air. Valves of such nature may also be referred to as booster regulators and are commercially available as VBA Series booster regulators from SMC Corporation (Tokyo, Japan).

The marine engine system 100 further includes the mixing chamber 500. The mixing chamber 500 includes inlets in communication with the separation unit 300 to receive the nitrogen-enriched air stream 310 and the air valve 200 to receive the intake air stream 210 and an outlet in communication with the combustion chamber 110 of the marine engine 101 for providing the nitrogen-enriched intake air stream 510 to the combustion chamber 110. Specifically, with reference to FIGS. 1 through 6, the marine engine system 100 includes a nitrogen conduit extending between the separation unit 300 and the mixing chamber 500 that allows the nitrogen-enriched air stream 310 to flow from the separation unit 300 to the mixing chamber 500. Similarly, the marine engine system 100 includes a compressed air conduit extending between the air valve 200 and the mixing chamber 500 that allows intake air stream 210 to flow from the air valve 200 to the mixing chamber 500.

The mixing chamber 500, in embodiments, includes a chamber that is suitable to mix gasses therein. In particular, the intake air stream 210 and the nitrogen-enriched air stream 310 mix within the mixing chamber 500 to generate the nitrogen-enriched intake air stream 510. In embodiments, the intake air stream 210 may generally dilute the concentration of nitrogen in the nitrogen-enriched air stream 310, such that the nitrogen-enriched intake air stream 510 generally has a lower concentration of nitrogen than the nitrogen-enriched air stream 310 alone. In some embodiments, the nitrogen-enriched intake air stream 510 may include at least 79.5% Nitrogen by volume. The nitrogen-enriched intake air stream 510, in some embodiments, may include at least 80.0% Nitrogen by volume. In some embodiments, the nitrogen-enriched intake air stream 510 may include at least 80.5% Nitrogen by volume. The nitrogen-enriched intake air stream 510, in some embodiments, may include at least 81.0% Nitrogen by volume. In some embodiments, the nitrogen-enriched intake air stream 510 may include at least 82.0% Nitrogen by volume. The nitrogen-enriched intake air stream 510, in some embodiments, may include at least 84.0% Nitrogen by volume.

In some embodiments, the nitrogen-enriched intake air stream 510 may include between about 79.5% and about 85.0% Nitrogen by volume, inclusive of the end points. In some embodiments, the nitrogen-enriched intake air stream 510 may include between about 79.5% and about 84.0% Nitrogen by volume, inclusive of the end points. In some embodiments, the mixed stream 18 may include between about 79.5% and about 82% Nitrogen by volume, inclusive of the end points. That is, in various embodiments, the target nitrogen concentration of the nitrogen-enriched intake air stream 510 may be between 79.5% and about 85.0% Nitrogen by volume, about 79.5% and about 84.0% Nitrogen by volume, or between about 79.5% and about 82% Nitrogen by volume, inclusive of the end points.

In one or more embodiments, to account for the pressure of the nitrogen-enriched air stream 310 exiting the separation unit 300 typically being at a greater pressure than the intake air stream 210 provided from the air valve, a pressure letdown valve 316 may be provided in the nitrogen conduit connecting the separation unit 300 and the mixing chamber 500. For example, the pressure loss across the one or more membranes 302 of the separation unit 300 may be approximately 2 bar resulting in the nitrogen-enriched air stream 310 exiting the separation unit 300 at a pressure of approximately 9 bar for a separator feed stream 410 pressure of 11 bar. As the feed of the nitrogen-enriched intake air stream 510 from the mixing chamber 500 and the intake air stream 210 are both typically at a pressure of 5.5 bar, the pressure of the nitrogen-enriched air stream 310 is desirably also reduced to 5.5 bar before passage to the mixing chamber 500. The pressure letdown valve 316 reduces the pressure of the nitrogen-enriched air stream 310 to the desired pressure for mixing with the intake air stream 210 in the mixing chamber 500.

In one or more embodiments, the marine engine system 100 includes a check valve 312 positioned between the separation unit 300 and the mixing chamber 500. The check valve 312 may include a one-way valve or the like that permits flow of the nitrogen-enriched air stream 310 from the separation unit 300 to the mixing chamber 500 through the check valve 312, but restricts flow of gas from the mixing chamber 500 to the separation unit 300 through the check valve 312.

In one or more embodiments, the marine engine system 100 includes a check valve 212 positioned between the air valve 200 and the mixing chamber 500. The check valve 212 may include a one-way valve or the like that permits flow of the intake air stream 210 from the air valve 200 to the mixing chamber 500 through the check valve 212, but restricts flow of gas from the mixing chamber 500 back to the air valve 200 through the check valve 212.

In one or more embodiments, the marine engine system 100 includes a check valve 412 positioned between the air operated compressor 400 and the separation unit 300. The check valve 412 may include a one-way valve or the like that permits flow of the separator feed stream 410 from the air operated compressor 400 to the separation unit 300 through the check valve 412, but restricts flow of gas from the separation unit 300 to the air operated compressor 400 through the check valve 312.

In one or more embodiments, the marine engine system 100 includes a check valve 522 positioned between the air valve 200 and the air operated compressor 400. The check valve 522 may include a one-way valve or the like that permits flow of the recovered air stream 220 from the air valve 200 to the air operated compressor 400 through the check valve 522, but restricts flow of gas from the air operated compressor 400 to the air valve 200 through the check valve 312.

In embodiments, the mixing chamber 500 is in communication with the intake manifold 124, for example through a conduit. Through the conduit, in some embodiments, the nitrogen-enriched intake air stream 510 is passed from the mixing chamber 500 to the intake manifold 124. In some embodiments, the marine engine 101 may include a check valve 512 positioned between the mixing chamber 500 and the intake manifold 124 on the conduit carrying the nitrogen-enriched intake air stream 510. In embodiments, the check valve 512 may include a one-way valve or the like that permits the flow of the nitrogen-enriched intake air stream 510 from the mixing chamber 500 to the intake manifold 124 through the check valve 512, while restricting flow of gas from the intake manifold 124 to the mixing chamber 500 through the check valve 512.

From the intake manifold 124, the nitrogen-enriched intake air stream 510 passes into the combustion chamber 110. Fuel, and more specifically a heavy fuel oil, may also be passed into the combustion chamber 110, and may be mixed with the nitrogen-enriched intake air stream 510. The mixture of the fuel and the nitrogen-enriched intake air stream 510 is combusted, thereby moving the piston 120. As described supra, linear movement of the piston 120 may be converted into rotational movement of the crankshaft 122.

Referring still to FIGS. 1 through 6, exhaust gases produced by the combustion within the combustion chamber 110 are passed to the exhaust manifold 126. At least a portion of the exhaust gases passed from the exhaust manifold 126 may be passed to the turbine 134, for example through a conduit 168 extending between the exhaust manifold 126 and the turbine 134. As described supra, in embodiments, the exhaust gases may drive the turbine 134 to rotate, thereby rotating the shaft 136, and accordingly thereby rotating the compressor 132.

Without being bound by theory, the nitrogen-enriched intake air stream 510 may reduce the temperature of combustion within the combustion chamber 110 as compared to internal combustion engines that combust an air and fuel mixture having a lesser nitrogen concentration. For example, air and fuel mixtures having a greater volume percentage of oxygen, and accordingly a lower nitrogen concentration, as compared to the nitrogen-enriched intake air stream 510 may increase the temperature of combustion within the combustion chamber 110.

By reducing the temperature of combustion within the combustion chamber 110, NOx produced by combustion within the combustion chamber 110 may be reduced. In particular, lower combustion temperatures may reduce chemical reactions that lead to the production of NOx. In this way, by generating and combusting a nitrogen-enriched intake air stream 510 having a comparatively high nitrogen concentration as compared to air, the marine engine system 100 may operate with reduced NOx emissions as compared to conventional combustion engines.

Moreover, by reducing NOx emissions via the nitrogen-enriched intake air stream 510, marine engines 101 according to the present disclosure of the marine engine system 100 may reduce NOx emissions without aftertreatment processes, such as exhaust gas recirculation (EGR) or selective catalytic reduction (SCR).

By reducing NOx emissions without the use of EGR, marine engine systems 100 according to the present disclosure may reduce NOx emissions while utilizing heavy fuel oil. Without being bound by theory, the comparatively high sulfur content of heavy fuel oil, as compared to other petroleum-based fuels, as well as the amount of soot and particulates produced by the combustion of heavy fuel oil make the use of EGR systems with heavy fuel oil difficult. For example, exhaust gases including sulfur, SOx, soot and particulates resulting from the combustion of heavy fuel oil may be incompatible for use with EGR systems. Accordingly, by reducing NOx emissions without the use of EGR systems, marine engine systems 100 according to the present disclosure may reduce NOx emissions while utilizing heavy fuel oil. Furthermore, because NOx emissions can be reduced without the use of EGR systems, the marine engine system 100 does not require components associated with EGR systems, such as large heat exchangers, reducing the complexity and cost of the marine engine system 100 and operation of the included marine engine 101.

Further, by reducing NOx emissions without the use of SCR, emissions related to ammonia slip may be avoided. Additionally, by reducing NOx emissions without the use of SCR, the cost and complexity of marine engine systems 100 according to the present disclosure may be reduced as compared to engines utilizing SCR systems.

Figure 7:
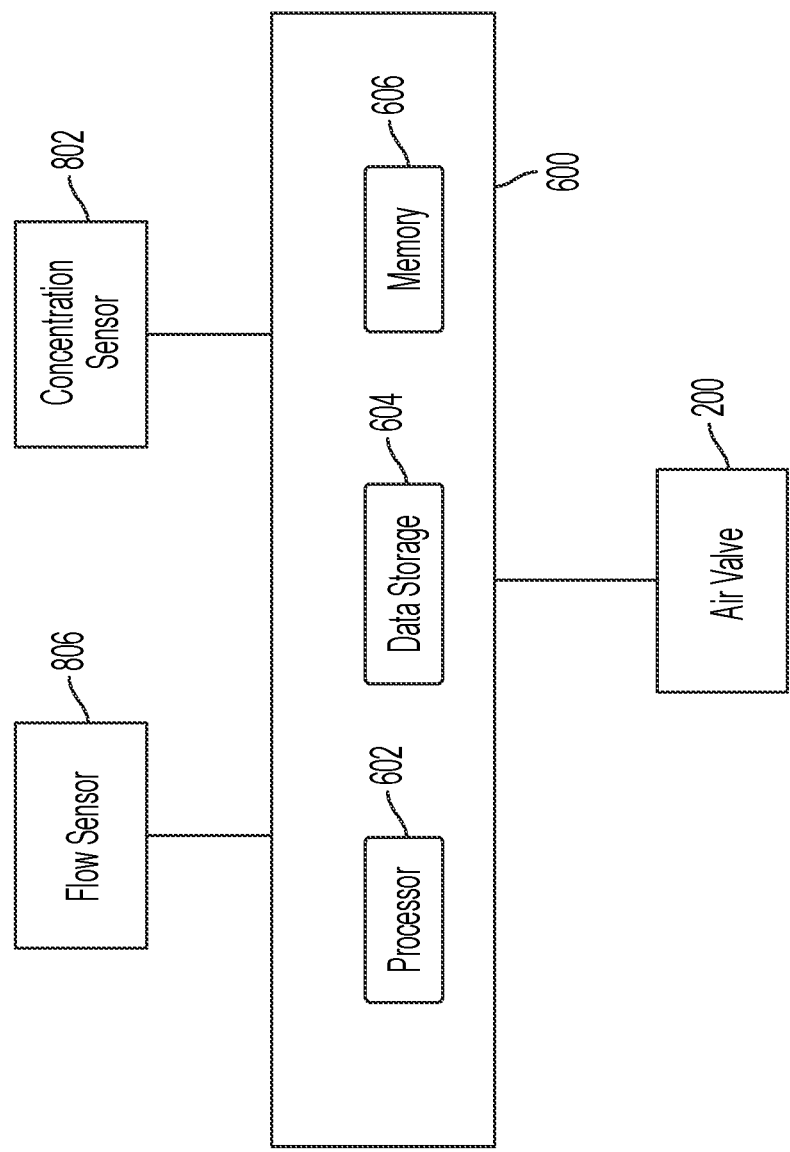
FIG. 7 schematically depicts a control diagram of a marine engine system, according to one or more embodiments shown and described herein.

Referring to FIG. 7, a control diagram of the marine engine system 100 is schematically depicted. In embodiments, the marine engine system 100 includes an air flow controller 600. As illustrated, the air flow controller 600 includes a processor 602. The air flow controller 600, in one or more embodiments, may also include a data storage component 604, a memory component 606, or both the data storage component 604 and the memory component 606. The memory component 606 may be configured as volatile memory, nonvolatile memory, or a combination of volatile and nonvolatile memory and as such, may include one or more of random access memory (including SRAM, DRAM, and other types of RAM), flash memory, secure digital (SD) memory, registers, compact discs (CD), digital versatile discs (DVD), and other types of non-transitory computer-readable mediums. It will be appreciated that these non-transitory computer-readable mediums may reside within the air flow controller 600 in some embodiments or, in further embodiments, reside external to the air flow controller 600.

The memory component 606 may store operating logic, analysis logic, and communication logic in the form of one or more computer readable and executable instruction sets. The analysis logic and the communication logic may each include a plurality of different pieces of logic, each of which may be embodied as a computer program, firmware, or hardware, as an example. A local interface may also be included in the air flow controller 600, and may be implemented as a bus or other communication interface to facilitate communication among the components of the air flow controller 600.

The processor 602 may include any processing component operable to receive and execute instructions. For example the processor 602 may receive and execute instructions from the data storage component 604 and the memory component 606. It should be understood that while the components in FIG. 7 are illustrated as residing within the air flow controller 600, this is merely an example, and in some embodiments, one or more of the components may reside external to the air flow controller 600. It should also be understood that, while the air flow controller 600 is illustrated as a single device, this is also merely an example.

In one or more embodiments, the air flow controller 600 is communicatively coupled to one or more components of the marine engine system 100. In some embodiments, the marine engine system 100 includes a nitrogen concentration sensor 802 communicatively coupled to the air flow controller 600. The nitrogen concentration sensor 802, in embodiments, is structurally configured to detect a concentration of nitrogen in gas passing to the intake manifold 124. For example, the nitrogen concentration sensor 802 may detect a content of nitrogen within the nitrogen-enriched intake air stream 510 passing to the intake manifold 124 from the mixing chamber 500. The nitrogen concentration sensor 802, in embodiments, may send, receive, or both send and receive signals from the air flow controller 600. For example, in some embodiments, the nitrogen concentration sensor 802 sends signals to the air flow controller 600 indicative of the concentration of nitrogen in the nitrogen-enriched intake air stream 510.

In one or more embodiments, the marine engine system 100 includes a flow sensor 806 communicatively coupled to the air flow controller 600. The flow sensor 806, in embodiments, is structurally configured to detect the flow rate of gas passing to the mixing chamber 500. For example, the flow sensor 806 may be positioned between the separation unit 300 and the mixing chamber 500 to measure the flow rate of the nitrogen-enriched air stream 310 entering the mixing chamber. The flow sensor 806, in embodiments, may send, receive, or both send and receive signals from the air flow controller 600. For example, in some embodiments, the flow sensor 806 sends signals to the air flow controller 600 indicative of the flow rate of the nitrogen-enriched air stream 310 to the mixing chamber 500.

Figure 3:
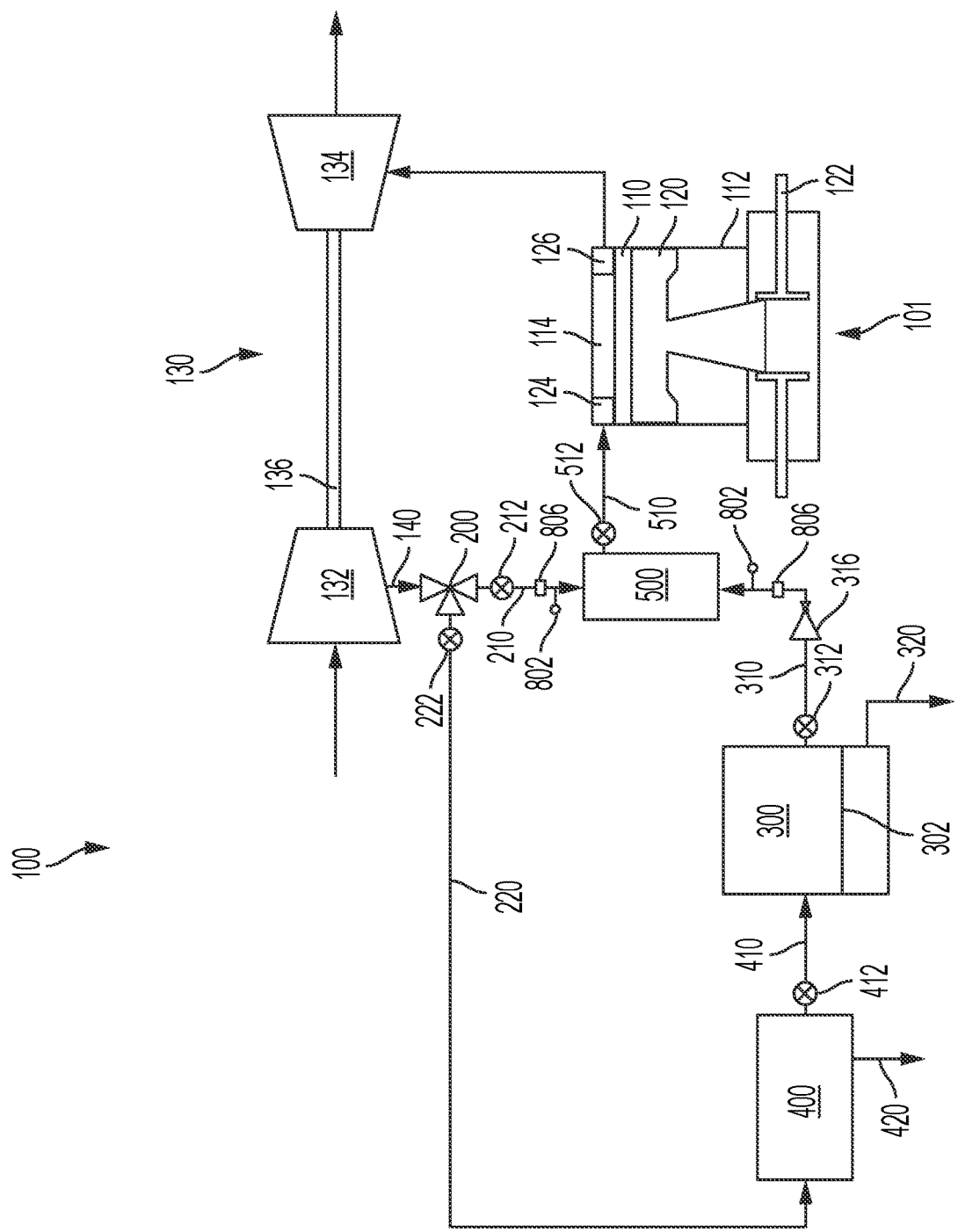
FIG. 3 schematically depicts a marine engine system with a turbocharger generating excess compressed air, according to one or more embodiments shown and described herein.

In one or more embodiments and with reference to FIG. 3, an instance of the nitrogen concentration sensor 802 and an instance of the flow sensor 806 is positioned between the separation unit 300 and the mixing chamber 500 and an additional instance of the nitrogen concentration sensor 802 and an additional instance of the flow sensor 806 is positioned between the air valve 200 and the mixing chamber 500. Such arrangement allows for measurement of the nitrogen concentration and flow of the stream entering the mixing chamber 500 from which the nitrogen concentration of the nitrogen-enriched intake air stream 510 may be determined. Additionally, measuring the parameters of the intake air stream 210 and the nitrogen-enriched air stream 310 individually allows for greater insight into desired positioning of the air valve 200. While such arrangement is illustrated in FIG. 3, it will be readily appreciated that such arrangement may also be implemented into the embodiments shown in the remaining figures.

In one or more embodiments, the air flow controller 600 is communicatively coupled to the air valve 200. The air flow controller 600 may send, receive, or send and receive signals from the air valve 200. For example, in some embodiments, the air flow controller 600 may direct the air valve 200 to adjust positions to change the split of flow between the intake air stream 210 and the recovered air stream 220.

In one or more embodiments, the adjustment of the air valve 200 may be directed by the air flow controller 600 based at least in part on a signal received from one or more of the nitrogen concentration sensor 802 and the flow sensor 806. For example, the air flow controller 600, in one or more embodiments, may direct the air valve 200 to adjust positions to change the split of flow between the intake air stream 210 and the recovered air stream 220 based at least in part on a detected nitrogen concentration received from the nitrogen concentration sensor 802. Further, in one or more embodiments, the air flow controller 600 may direct the air valve 200 to adjust positions to change the split of flow between the intake air stream 210 and the recovered air stream 220 based at least in part on a gas flow received from the flow sensor 806. Further, it will be appreciated that in one or more embodiments, the air flow controller 600 may direct the air valve 200 to adjust positions to change the split of flow between the intake air stream 210 and the recovered air stream 220 based at least in part on a gas flow received from the flow sensor 806 and a detected nitrogen concentration received from the nitrogen concentration sensor 802.

In one or more embodiments and with reference to FIGS. 1, 2, 4, 5, and 6, the marine engine system 100 includes at least one supplemental compressor 700 in addition to the compressor 132 provided as part of the turbocharger 130. The supplemental compressor 700 may be configured to provide supplemental compressed air 710 to the separation unit 300. Specifically, as the separation process in the separation unit 300 reduces the total flow of air provided to the mixing chamber 500 with separation of the nitrogen-enriched air stream 310 and the nitrogen-depleted air stream 320, the supplemental compressor 700 provides additional compressed air beyond that provided in the recovered air stream 220 to provide sufficient flow to the mixing chamber 500. Further, the flow of the recovered air stream 220 is also reduced with passage through the air operated compressors 400. For example, in one or more embodiments, the recovered air stream 220 may have a flow of 0.4 kg/s which is reduced to 0.33 kg/s after the air operated compressor 400 and further reduced to 0.23 kg/s after the separation unit 300 assuming an air recover rate of 70% in the separation unit 300. As 0.4 kg/s was drawn away from the compressed air stream 140 exiting the compressors 132 as the recovered air stream 220 a commensurate flow of the nitrogen-enriched air stream 310 should be provided to maintain the same total flow to the marine engine 101. Providing 0.28 kg/s of supplemental compressed air 710 along with the recovered air stream 220 for a total flow of 0.68 kg/s to the air operated compressor 400 achieves a flow of 0.4 kg/s of the nitrogen-enriched air stream 310 for provision to the mixing chamber 500.

Figure 2:
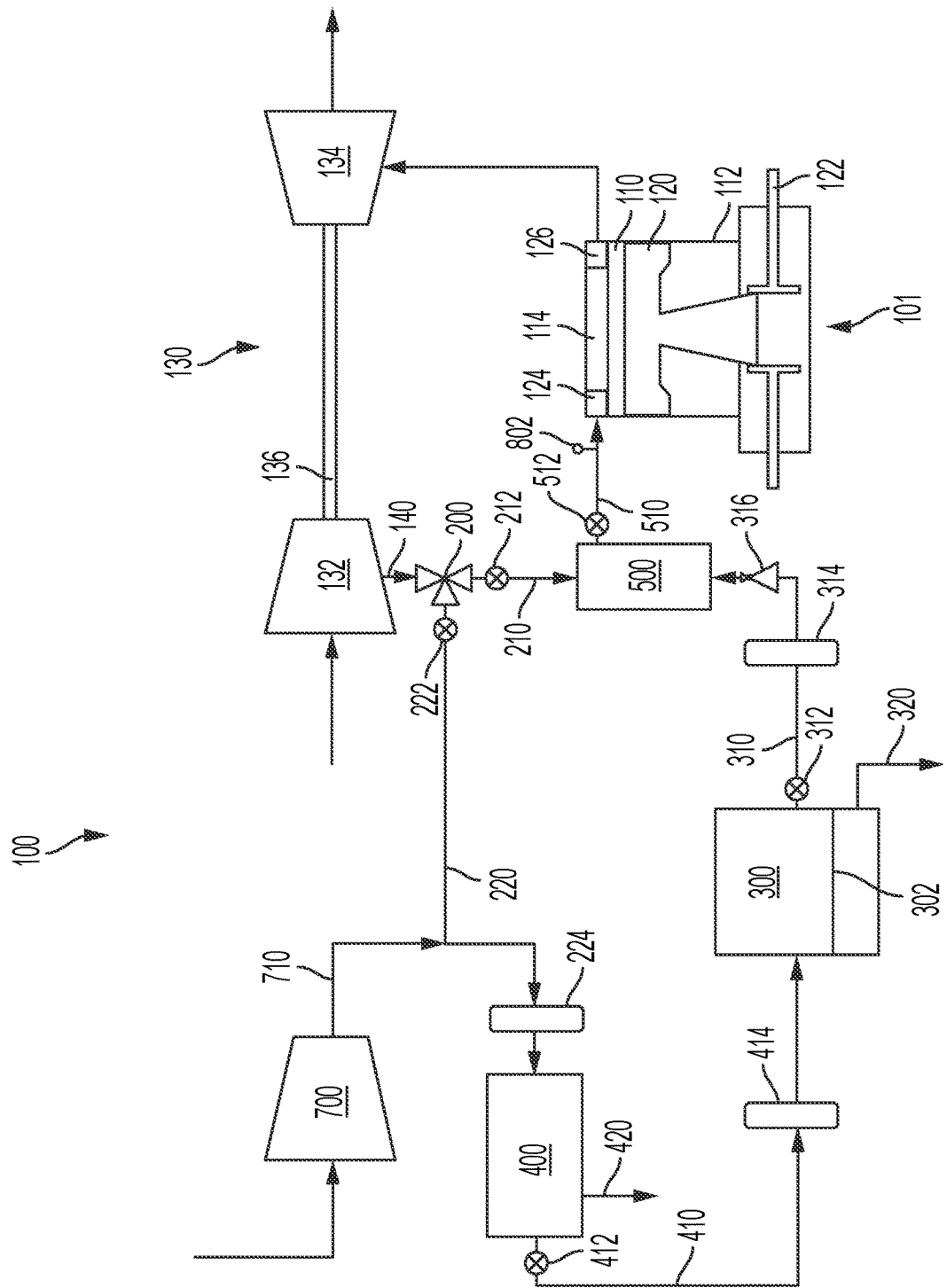
FIG. 2 schematically depicts the marine engine system of FIG. 1 with buffer tanks, according to one or more embodiments shown and described herein.

In one or more embodiments and with reference to FIGS. 1 and 2, the supplemental compressor 700 provides the supplemental compressed air 710 to the air operated compressor 400. Providing the supplemental compressed air 710 to the air operated compressor 400 allows the supplemental compressor 700 to generate a lower pressure supplemental compressed air stream. For example, the separator feed stream 410 provided to the separation unit 300 may desirously be provided at a pressure of 11 bar, but combining the supplemental compressed air with the recovered air stream 220 prior to the air operated compressor 400 allows for the supplemental compressor 700 to generate compressed air at only 5.5 bar.

Figure 4:
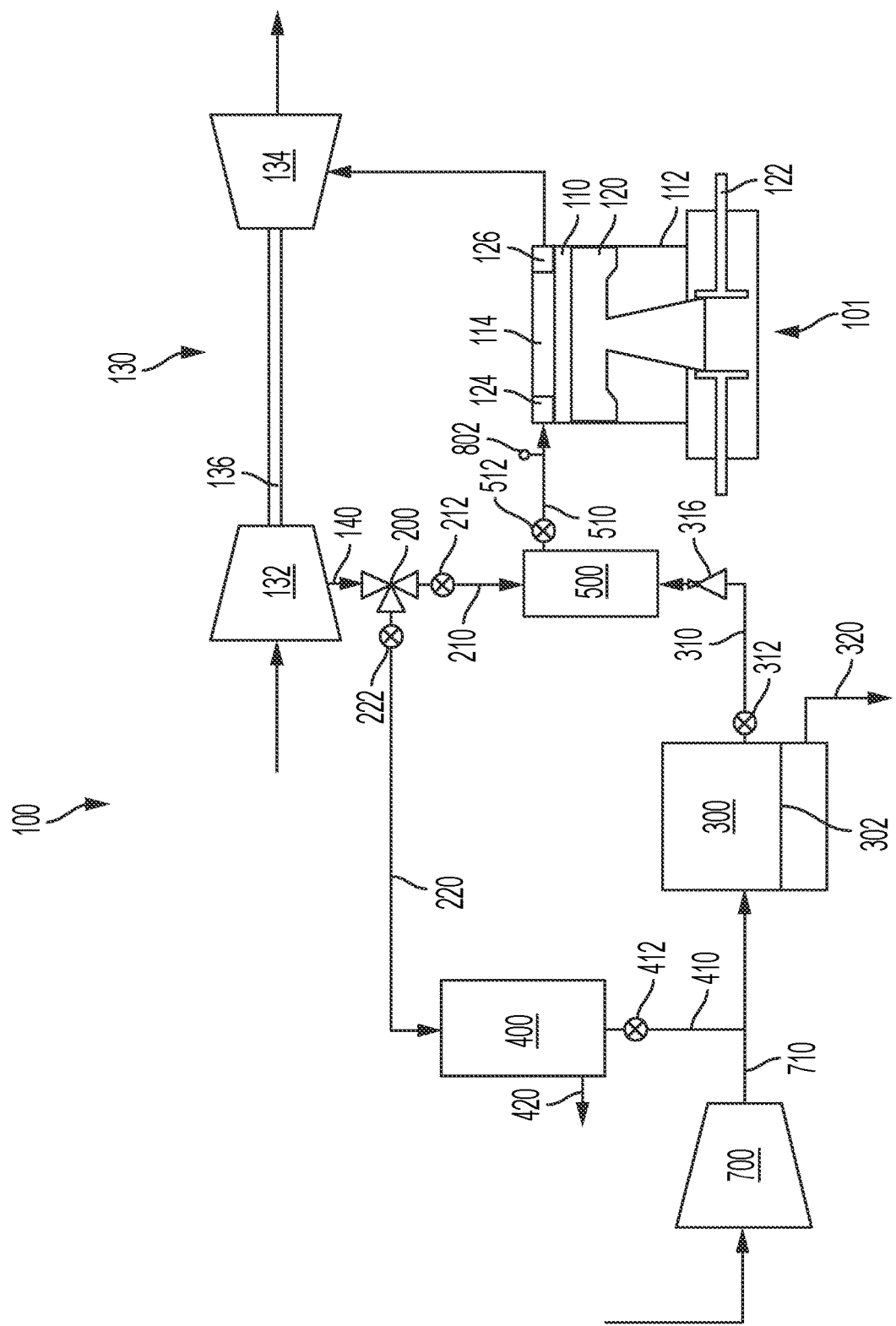
FIG. 4 schematically depicts a marine engine system with supplemental compressed air provided directly to a separation unit, according to one or more embodiments shown and described herein.
Figure 5:
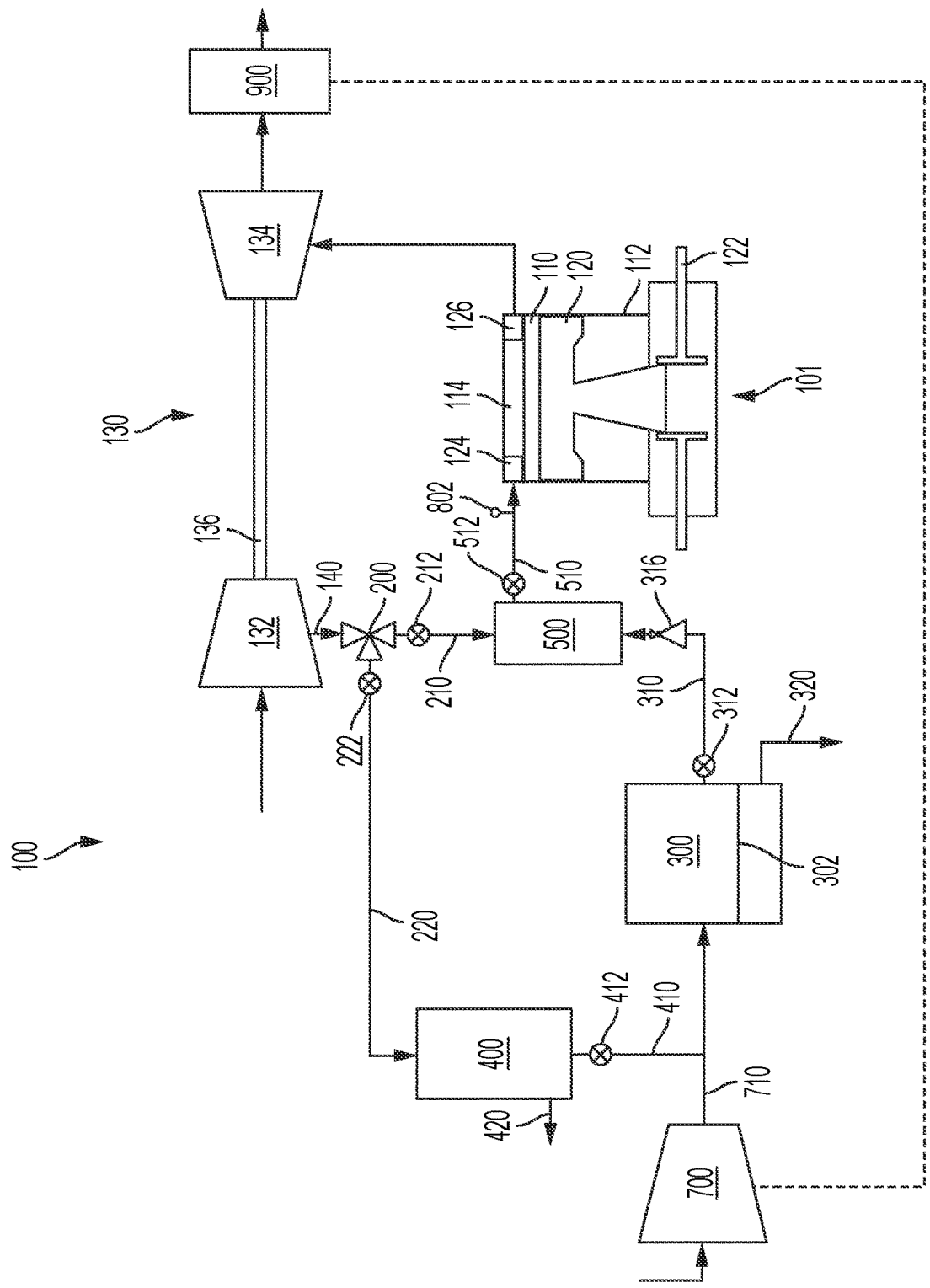
FIG. 5 schematically depicts the marine engine system of FIG. 4 with a generator providing power to generate the supplemental compressed air, according to one or more embodiments shown and described herein.

In one or more embodiments and with reference to FIGS. 4 and 5, the supplemental compressor 700 provides the supplemental compressed air 710 directly to the separation unit 300. Providing the supplemental compressed air 710 directly to the separation unit allows the supplemental compressor 700 to generate the supplemental compressed air stream 710 at a lower flow rate as there is no loss of flow with the air operated compressor exhaust stream 420 from passage through the air operated compressor 400.

In one or more embodiments and with reference to FIG. 5, the marine engine system 100 may include a generator 900 in communication with the exhaust energy generated by the marine engine 101. Specifically, the turbine 134 driven by the exhaust gas may be additionally coupled to the generator 900 to generate power for operation of at least one supplemental compressor 700. Leveraging the exhaust energy from the marine engine 101 to operate the generator 900 and power the supplemental compressor 700 reduces the need to provide auxiliary power to operate the supplemental compressor 700. The generator 900 may power the supplemental compressor 700 directly feeding the separation unit 300 as shown in FIG. 5, but it will be appreciated that the same power sharing arrangement may be utilized to power at least one supplemental compressor 700 in any of FIGS. 1, 2, 4, and 6 within the scope of the present disclosure.

In one or more embodiments and with reference to FIG. 3, the compressor 132 in the turbocharger 130 may generate excess compressed air at the compressed air outlet to account for the air drawn off from the recovered air stream 220 to operate the air operated compressor 400. Specifically, as the air operated compressor 400 typically requires an inlet flow rate of 1.2 times the desired outlet flow rate, excess compressed air must be generated for loss in the air operated compressor 400. To provide the nitrogen-enriched air stream 310 at flow rate of 0.4 kg/s, the recovered air stream 220 is drawn off at a rate of 0.68 kg/s requiring an excess production of 0.18 kg/s of compressed air in compressed air stream 140 by the compressor 132. While such arrangement provides economic and efficiency benefits through reduction or elimination of supplemental compressors 700, changes to the turbocharger mapping of the marine engine 101 are required. Specifically, as the load on the turbocharger 130 is increased, the turbocharger mapping must be updated which may not be agreeable to the manufacturer of the marine engine 101. In such case, the other embodiments which retain the standard turbocharger mapping and utilize the supplemental compressor 700 to provide any supplemental compressed air 710.

Figure 6:
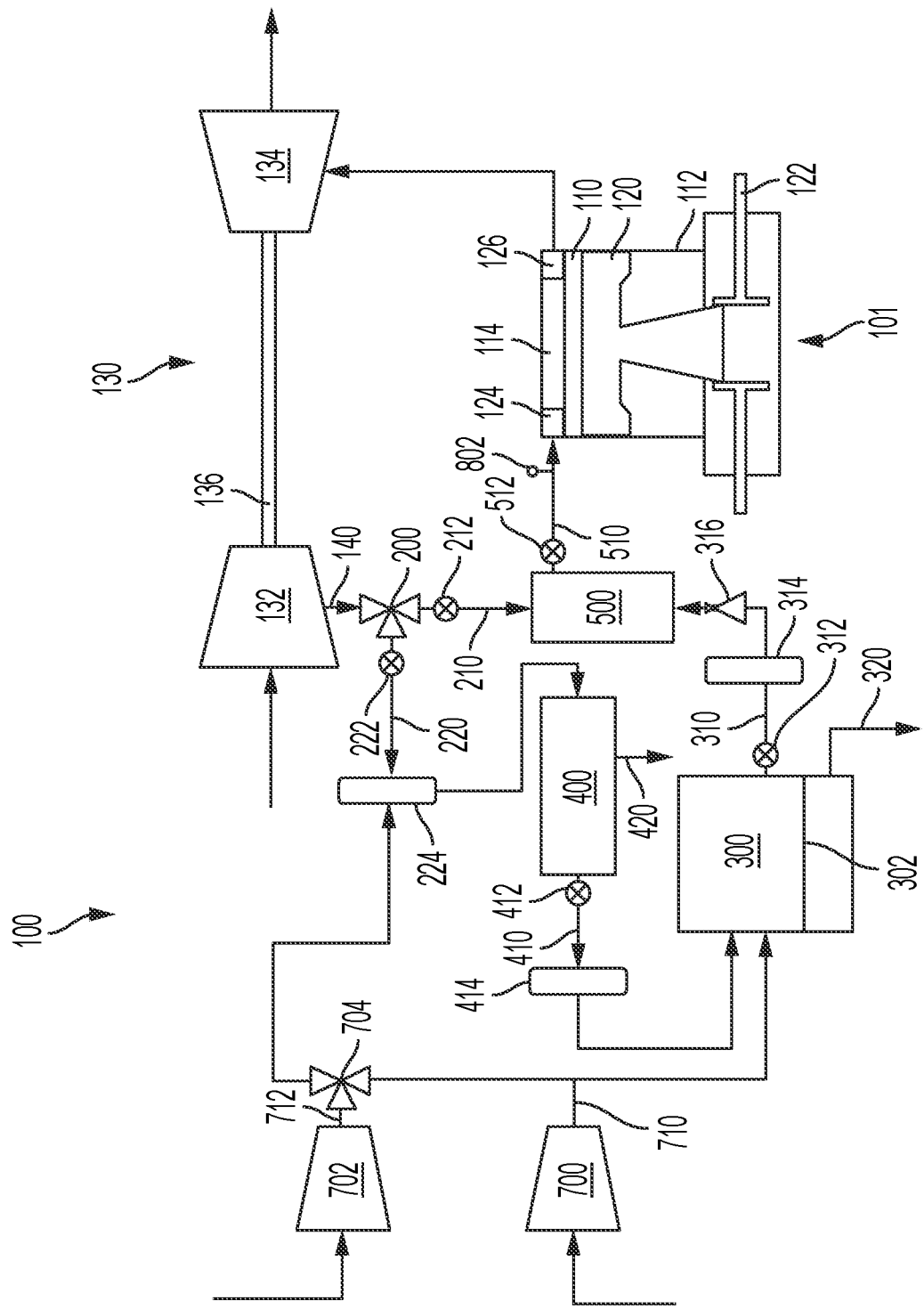
FIG. 6 schematically depicts a marine engine system with both a supplemental compressor and a second supplemental compressor, according to one or more embodiments shown and described herein.

In one or more embodiments and with reference to FIGS. 2 and 6, a first buffer tank 314 is positioned between the separation unit 300 and the mixing chamber 500 to collect the nitrogen-enriched air stream 310 before passage to the mixing chamber 500. It will be appreciated that in embodiments where a flow sensor 806 is provided between the separation unit 300 and the mixing chamber 500, the first buffer tank 314 should be positioned between the separation unit 300 and the flow sensor 806 such that flow may accurately be measured between the flow sensor 806 and the mixing chamber 500. Similarly, the first buffer tank 314 may be positioned prior to the pressure letdown valve 316. The first buffer tank 314 ensures a continuous supply of the nitrogen-enriched air stream 310 to the mixing chamber 500 in the event of fluctuations of flow from the separation unit 300.

In one or more embodiments and with reference to FIGS. 2 and 6, a second buffer tank 414 is positioned between the air operated compressor 400 and the separation unit 300 to collect the separator feed stream 410 before passage to the separation unit 300. It will be appreciated that in embodiments where a supplemental compressor 700 provides supplemental compressed air 710 directly to the separation unit 300, the second buffer tank 414 may be positioned either before or after the supplemental compressor 700. Specifically, the supplemental compressed air 710 may be captured in the second buffer tank 414 in one or more embodiments and provided directly to the separation unit 300 and in one or more further embodiments. The second buffer tank 414 ensures a continuous supply of the separator feed stream 410 to the separation unit 300 in the event of fluctuations of flow from the supplemental compressor 700 or the air operated compressor 400.

In one or more embodiments and with reference to FIGS. 2 and 6, a third buffer tank 224 is positioned between the air valve 200 and the air operated compressor 400 to collect the recovered air stream 220 before passage to the air operated compressor 400. It will be appreciated that in embodiments where a supplemental compressor 700 provides supplemental compressed air 710 to the air operated compressor 400, the third buffer tank 224 may be positioned either before or after the supplemental compressor 700. Specifically, the supplemental compressed air 710 may be captured in the third buffer tank 224 in one or more embodiments and provided directly to the air operated compressors 400 and in one or more further embodiments. The third buffer tank 224 ensures a continuous supply of the recovered air stream 220 to the air operated compressors 400 in the event of fluctuations of flow from the supplemental compressor 700 or the air valve 200.

In one or more embodiments and with reference to FIG. 6, the marine engine system 100 includes a second supplemental compressor 702 configured to provide additional supplemental compressed air 712. In such arrangement the supplemental compressor 700 may provide the supplemental compressed air 710 to the separation unit 300 and the second supplemental compressor 702 may selectively provide the additional supplemental compressed air 712 to the separation unit 300, the third buffer tank 224, or both. The selective routing of the additional supplemental compressed air 712 to the separation unit 300 or the third buffer tank 224 may be achieved with a second supplemental compressor routing valve 704. The second supplemental compressor routing valve 704 may be a 3-way valve in one or more embodiments.

Having generally described the marine engine system 100, methods for operating the marine engine system 100 are briefly provided. In one or more embodiments operating the marine engine system 100 includes passing air to the compressor 132 of the turbocharger 130 to form the compressed air stream 140 and splitting the compressed air stream 140 exiting the compressor 132 with the air valve 200 to generate the intake air stream 210 directed to the mixing chamber 500 and the recovered air stream 220 directed to the separation unit 300. The recovered air stream 220 is passed to the air operated compressor 400 to increase the pressure of the air in the recovered air stream 220 and generate the separator feed stream 410. The separator feed stream 410 is then passed to the separation unit 300 which separates the separator feed stream 410 into the nitrogen-enriched air stream 310 and the nitrogen-depleted air stream 320 with one or more membranes 302 that are structurally configured to generate the nitrogen-enriched air stream 310 having a greater nitrogen concentration that the separator feed stream 410. Further, the nitrogen-enriched air stream 310 is passed to the mixing chamber 500 and the intake air stream 210 is also passed to the mixing chamber 500 where the intake air stream 210 and the nitrogen-enriched air stream 310 are mixed to generate the nitrogen-enriched intake air stream 510. The nitrogen-enriched intake air stream 510 and a heavy fuel oil are passed to the combustion chamber 110 of the marine engine 101 and combusted to move the piston 120 within the combustion chamber 110. During operation of the marine engine system 100, a baseline total mass air flow to the marine engine 101 based on a load on the marine engine 101 is determined and the air valve 200 is positioned to adjust the split between the intake air stream 210 and the recovered air stream 220 such that the baseline total mass air flow to the marine engine 101 is provided to the combustion chamber 110 of the marine engine 101.

With reference to FIG. 6, the marine engine system 100 may be operated to handle transient operation of the marine engine when the load on the marine engine 101 varies from 10% to 100%. The marine engine 101 operating at 100% load may require an air flow into the combustion chamber 110 of 2.4 kg/s. To generate the nitrogen-enriched air stream 310 for provision to the mixing chamber 500 before and at ignition of the marine engine 101, the supplemental compressor 700 and the second supplemental compressor 702 may be operated in combination to provide a combines 0.57 kg/s of air at 11 bar to the separation unit 300. Such operation allows for the second buffer tank 414 and the third buffer tank 224 to be charged and filled with air supplied from diversion of the recovered air stream 220 while still supplying a full volume of the nitrogen-enriched air stream 310 to the mixing chamber 500. It will be appreciated that the first buffer tank 314 may be filled with one or both of the supplemental compressor 700 and the second supplemental compressor 702 before starting the marine engine 101. Once steady-state flow is achieved one of the supplemental compressor 700 and the second supplemental compressor 702 may be taken off-line.

With continued reference to FIG. 6, in one or more embodiments, the first buffer tank 314, the second buffer tank 414, and the third buffer tank 224 may be used to ensure a continuous flow of the nitrogen-enriched air stream 310 to the marine engine 101. For the first cycle of operation, the time taken for the air flow to be filled from the third buffer tank 224 to the second buffer tank 414 is around 1 minutes. For the first 1 minute of operation, the marine engine system 100 may utilize both the supplemental compressor 700 and the second supplemental compressor 702 to feed the entire air flow of 0.57 kg/s required by the one or more membranes 302 in the separation unit 300 to generate 0.4 kg/s of the nitrogen-enriched air stream 310. The total power consumption during this initial 1 minute of operation is approximately 150 KW based on theoretical calculation. When the nitrogen-enriched air stream 310 is supplied to the marine engine 101, an equivalent amount of air is displaced from the compressed air stream 140 as the recovered air stream 220 to maintain constant flow to the marine engine 101. The recovered air stream 220 may then be utilized to fill the third buffer tank 224 and pass through the air operated compressor 400 into the second buffer tank 414. Once the required flow is ready from the second buffer tank 414 to be supplied to separation unit 300, only one of the supplemental compressor 700 and the second supplemental compressor 702 needs operated to generate the required additional flow of 0.28 kg/s. By doing this, the power consumption will be reduced from approximately 150 kW to approximately 65 KW within 1 minute of operation of the marine engine system 100. After continuous flow is established, the total power consumption is approximately 65 kW at 100% load. Depending on the operation hours of the ships at different loads and different regions, the total power consumption can be reduced to around 30 KW accounting for periods of reduced load. When the engine load is changed, the stored nitrogen-enriched air stream 310 in the first buffer tank 314 and the compressed air in the second buffer tank 414 and the third buffer tank 224 may be utilized until the marine engine system 100 is adapted to different flow and pressure requirements. In case of any interruption in the flow, one or both of the supplemental compressor 700 and the second supplemental compressor 702 may immediately turn to operation to supply the air and prevent stalling of the marine engine 101. The air flow controller 600 may perform the necessary control adjustments on the air as the engine load is varied from 10% to 100%.

These power saving operations translate to the embodiments of the other figures as well. For example, with reference to FIG. 1, operating at a total air flow to the marine engine 101 of 2.4 kg/s at 5.5 bar allows for 0.4 kg/s of air at 5.5 bar to be drawn off in the recovered air stream 220, 0.28 kg/s of air at 5.5 bar to be provided by the supplemental compressor 700, and fed back into the mixing chamber 500 as the nitrogen-enriched air stream 310 at 0.4 kg/s and 5.5 bar. With reference to FIG. 3, operating at a total air flow to the marine engine 101 of 2.4 kg/s at 5.5 bar allows for the compressor 132 to generate 2.68 kg/s of compressed air at 5.5 bar and then drawing off 0.4 kg/s of the compressed air at 5.5 bar in the recovered air stream 220 and then being fed back into the mixing chamber 500 as the nitrogen-enriched air stream 310 at 0.4 kg/s and 5.5 bar. Such arrangement allows for the exclusion of the supplemental compressor 700 and the efficiency of operating the compressor 132 in the turbocharger 130. With reference to FIG. 4, operating at a total air flow to the marine engine 101 of 2.4 kg/s at 5.5 bar allows for 0.4 kg/s of air at 5.5 bar to be drawn off in the recovered air stream 220, 0.24 kg/s of air at 11 bar to be provided by the supplemental compressor 700, and fed back into the mixing chamber 500 as the nitrogen-enriched air stream 310 at 0.4 kg/s and 5.5 bar. Finally, with reference to FIG. 5, operating at a total air flow to the marine engine 101 of 2.4 kg/s at 5.5 bar allows for 0.4 kg/s of air at 5.5 bar to be drawn off in the recovered air stream 220, 0.24 kg/s of air at 11 bar to be provided by the supplemental compressor 700 powered by the generator 900, and fed back into the mixing chamber 500 as the nitrogen-enriched air stream 310 at 0.4 kg/s and 5.5 bar. It will be appreciated that the embodiment of FIG. 5 may be adopted to align with the layout of FIG. 1 in conjunction with the generator 900 such that 0.28 kg/s of air at 5.5 bar is provided by the supplemental compressor 700 to the air operated compressor 400.

The power savings from operating in accordance with embodiments of the present disclosure are provided in Table 1. Further, the benefit of utilizing the one or more membranes 302 with a purity of 90% opposed to 99% is demonstrated as well. Specifically, Table 1 details the power requirements operating at 100% load when the membrane 302 is a 90% membrane purity and when a 99% membrane purity is utilized. As the 99% membrane purity requires further supplemental compressed air 710 and underutilizes the recovered air stream 220 the power savings is reduced. The baseline design provides the entire flow to the separation unit 300 at 11 bar using an external compressor, such as the supplemental compressor 700, with excess compressed air generated form the compressor 132 of the turbocharger 130 vented to the atmosphere.

TABLE 1

| Membrane Purity (%) | Separator Feed Stream (kg/s) | Nitrogen Enriched Air Stream (kg/s) | Intake Air Stream (kg/s) | Nitrogen Enriched Intake Air Stream (kg/s) | Baseline Design | Design of FIG. 1 | Design of FIG. 3 |
|---|---|---|---|---|---|---|---|
| 99% | 0.6 | 0.2 | 2.2 | 2.4 | 150 kW | 110 kW | 10 kW |
| 90% | 0.57 | 0.4 | 2.0 | 2.4 | 150 kW | 65 kW | 10 kW |

The savings extended from usage of the membrane 302 having a membrane purity of 90% opposed to 99% extends to space, weight, and unit cost savings as well. Specifically, usage of the membrane 302 having a membrane purity of 90% allows for fewer membranes 302 to be used as each membrane 302 is capable of processing a greater volume of compressed air which translates to less physical space as well as less acquisition and replacement costs. Such savings is presented in Table 2 for operation if the marine engine system 100 illustrated in FIG. 1 operating at 100% load.

TABLE 2

| Design Target | 99% Membrane Purity | 90% Membrane Purity | % Reduction |
|---|---|---|---|
| Power (kW) | 110 | 65 | 50 |
| Weight (ton) | 5 | 3 | 40 |
| Number of Membranes | 10 | 3 | 70 |

It will be appreciated that the demands on the marine engine 101 are reduced as the load on the marine engine 101 changes during the operational cycle of the marine vessel. Specifically, the required air flow rates to the marine engine 101 at 50% load and 10% load are reduced compared to at 100% load. The flow requirements generally reduces linearly when load is reduced from 100% to 50%; however, it is noted that at lesser loads the intake air requirement is relatively greater. Table 3 provides the flow through the marine engine system 100 according to FIG. 1 for a 2% nitrogen increase in the nitrogen-enriched intake air stream 510 having a flow rate of 2.4 kg/s compared to the nitrogen content of the compressed air stream 140. It is noted that the flow rate of the nitrogen-enriched air stream 310 provided to the mixing chamber 500 reduces from 0.4 kg/s to 0.2 kg/s and then to 0.1 kg/s at 100% load, 50%, and 10% load, respectively.

TABLE 3

| Engine Load (%) | Nitrogen Enriched Intake Air Stream (kg/s) | Nitrogen Enriched Air Stream (kg/s) | Intake Air Stream (kg/s) | Recovered Air Stream (kg/s) | Supplemental Compressed Air (kg/s) | Power (kW) |
|---|---|---|---|---|---|---|
| 100 | 2.4 | 0.4 | 2 | 0.4 | 0.28 | 65 |
| 50 | 1.2 | 0.2 | 1 | 0.2 | 0.13 | 30 |
| 10 | 0.5 | 0.1 | 0.4 | 0.1 | 0.07 | 16 |

It is noted that the Tier 3 IMO NOx regulation (80% reduction compared to Tier 1 standards) are applicable only in the Emission Controlled Areas (ECA's). For the marine engine 101 rated speed of 720 rpm, the NOx emission compliance is 2.4 g/kWh. Though the marine engine system 100 is designed to handle 100% load, the engine doesn't operate at 100% load at normal sea going operation. Also, it is noted that marine vessels are not running in ECA zones all the time. Therefore, the marine engine system 100 could be operated at loads relatively less than 100% load and only when the marine vessels are operated in ECA zones. This will significantly reduce the operational expenditures as well as capital expenditures as the operational hours are reduced. For reference, Table 4, provides typical operational parameters for a marine vessel.

TABLE 4

| | Number of Operation | Average Load [%] |
|---|---|---|
| Idle | 1 | 50 |
| Port in/out | 3 | 75 |
| Port loading | 2 | 75 |
| Port unloading | 2 | 75 |
| Normal seagoing | 2 | 50 |

It should now be understood the various aspects of the marine engine system and associated methods of operation are described and such aspects may be utilized in conjunction with various other aspects.

According to a first aspect, a marine engine system includes a marine engine comprising a combustion chamber configured for burning heavy fuel oil; a turbocharger comprising a compressor with an air inlet and a compressed air outlet, a turbine, and a shaft coupled to the compressor and the turbine, the turbine provided in an exhaust path of exhaust gases from the marine engine such that the turbine rotates the shaft which in turn rotates the compressor; a separation unit comprising one or more membranes that are structurally configured to concentrate nitrogen from a separator feed stream feed to generate a nitrogen-enriched air stream and a nitrogen-depleted air stream; an air valve positioned in a flow path exiting the compressor, wherein the air valve is variably positionable to split flow between an intake air stream and a recovered air stream; a mixing chamber with inlets in communication with the separation unit to receive the nitrogen-enriched air stream and the air valve to receive the intake air stream and an outlet in communication with the combustion chamber of the marine engine for providing a nitrogen-enriched intake air stream to the combustion chamber, wherein the nitrogen-enriched intake air stream is a formed from the combination of the nitrogen-enriched air stream and the intake air stream; an air operated compressor positioned in a recovery flow path connecting the air valve and the separation unit to receive the recovered air stream and generate a separator feed stream, the air operated compressor configured to increase the pressure of the recovered air stream with air drawn off from the recovered air stream driving the air operated compressor; and an air flow controller communicatively coupled to the air valve, the air flow controller comprising a processor and a computer readable and executable instruction set, which when executed, causes the processor to: determine a baseline total mass air flow rate to the marine engine based on a load on the marine engine; determine a valve position of the air valve to split flow between the intake air stream and the recovered air stream such that the nitrogen-enriched intake air stream is provided at a target nitrogen concentration to the combustion chamber of the marine engine and at the baseline total mass air flow rate; and direct the air valve to adjust to the determined valve position.

A second aspect includes the system of the first aspect further comprising a nitrogen concentration sensor structurally configured to detect a nitrogen content in the nitrogen-enriched intake air stream.

A third aspect includes the system of the first or second aspect further comprising a flow sensor positioned between the separation unit and the mixing chamber to measure the flow rate of the nitrogen-enriched air stream entering the mixing chamber.

A fourth aspect includes the system of any of the first through third aspects further comprising a supplemental compressor, the supplemental compressor configured to provide supplemental compressed air to the separation unit.

A fifth aspect includes the system of the fourth aspect in which the supplemental compressed air is provided to the air operated compressor.

A sixth aspect includes the system of the fourth aspect in which the supplemental compressed air is provided directly to the separation unit.

A seventh aspect includes the system of any of the first through sixth aspects in which a first buffer tank is positioned between the separation unit and the mixing chamber to collect the nitrogen-enriched air stream before passage to the mixing chamber.

An eighth aspect includes the system of any of the first through seventh aspects in which a second buffer tank is positioned between the air operated compressor and the separation unit to collect the separator feed stream before passage to the separation unit.

A ninth aspect includes the system of any of the first through eighth aspects in which a third buffer tank is positioned between the air valve and the air operated compressor to collect the recovered air stream before passage to the air operated compressor.

A tenth aspect includes the system of the ninth aspect further comprising a second supplemental compressor configured to provide additional supplemental compressed air, wherein the supplemental compressor provides the supplemental compressed air to the separation unit and the second supplemental compressor selectively provides the additional supplemental compressed air to the separation unit or the third buffer tank.

An eleventh aspect includes the system of any of the first through tenth aspects in which the air operated compressor increases the pressure of the recovered air stream such that the separator feed stream has a pressure 1.5 to 2.0 times the pressure of the recovered air stream.

A twelfth aspect includes the system of any of the first through eleventh aspects in which the membranes of the separation unit have an 85% to 95% membrane purity.

A thirteenth aspect includes the system of any of the first through eleventh aspects in which the membranes of the separation unit have an 89% to 91% membrane purity.

A fourteenth aspect includes the system of any of the first through thirteenth aspects in which the compressor in the turbocharger generates excess compressed air at the compressed air outlet to account for the air drawn off from the recovered air stream to operate the air operated compressor.

A fifteenth aspect includes the system of the third aspect in which the supplemental compressor is powered by a generator driven by exhaust energy from the marine engine.

A sixteenth aspect includes the system of any of the first through fifteenth aspects in which comprising one or more check valves positioned between the compressor and the combustion chamber.

A seventeenth aspect includes the system of any of the first through sixteenth aspects in which the target nitrogen concentration is at least 81.0% nitrogen by volume.

According to a seventeenth aspect, a method for operating a marine engine system includes passing air to a compressor of a turbocharger to form a compressed air stream, the turbocharger comprising the compressor, a turbine, and a shaft coupled to the compressor and the turbine, the turbine provided in an exhaust path of exhaust gases from a marine engine such that the turbine rotates the shaft which in turn rotates the compressor; splitting the compressed air stream exiting the compressor with an air valve positioned in a flow path exiting the compressor, wherein the air valve is variably positionable to split flow between an intake air stream directed to a mixing chamber and a recovered air stream directed to a separation unit; passing the recovered air stream to an air operated compressor positioned in a recovery flow path connecting the air valve and the separation unit to generate a separator feed stream, the air operated compressor configured to increase the pressure of the air in the recovered air stream with air drawn off from the recovered air stream driving the air operated compressor; separating the separator feed stream in the separation unit into a nitrogen-enriched air stream and a nitrogen-depleted air stream, wherein the separation unit comprises one or more membranes that are structurally configured to generate the nitrogen-enriched air stream having a greater nitrogen concentration that the separator feed stream; passing the intake air stream to the mixing chamber; passing the nitrogen-enriched air stream to the mixing chamber; mixing the intake air stream and the nitrogen-enriched air stream within the mixing chamber to generate a nitrogen-enriched intake air stream; determining a baseline total mass air flow rate to the marine engine based on a load on the marine engine; adjusting the air valve to adjust the split between the intake air stream and the recovered air stream such that the nitrogen-enriched intake air stream is provided at a target nitrogen concentration and the baseline total mass air flow rate to a combustion chamber of the marine engine; passing a heavy fuel oil to the combustion chamber; and combusting the heavy fuel oil and the nitrogen-enriched intake air stream within the combustion chamber, thereby moving a piston within the combustion chamber.

An eighteenth aspect includes the method of the seventeenth aspect further comprising detecting a nitrogen content within the nitrogen-enriched intake air stream and based at least in part on the detected nitrogen content within the nitrogen-enriched intake air stream, adjusting the air valve to adjust the split between the intake air stream and the recovered air stream such that a nitrogen content of nitrogen-enriched intake air stream is adjusted to a desired level.

A nineteenth aspect includes the method of the seventeenth or eighteenth aspect further comprising providing supplemental compressed air to the separation unit from a supplemental compressor.

A twentieth aspect includes the method of the nineteenth aspect in which the supplemental compressed air is provided to the air operated compressor.

A twenty-first aspect includes the method of the nineteenth aspect in which the supplemental compressed air is provided directly to the separation unit.

A twenty-second aspect includes the method of any of the seventeenth through twenty-first aspects in which the air operated compressor increases the pressure of the recovered air stream such that the separator feed stream has a pressure 1.5 to 2.0 times the pressure of the recovered air stream.

A twenty-third aspect includes the method of any of the seventeenth through twenty-second aspects in which the target nitrogen concentration is 78.0 to 79.0% nitrogen by volume when the marine engine system is operated outside an Emission Control Area.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the appended claims should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. For example, certain features that are described in this specification in the context of separate embodiments can also be implemented, in combination, in a single embodiment or aspect. Conversely, various features that are described in the context of a single embodiment or aspect can also be implemented in multiple embodiments, separately, or in any sub-combination. Moreover, although previously described features may be described as acting in certain combinations and even initially claimed as such through one or more multiple dependent claim(s), one or more features from a claimed combination can, in some cases, be excised from the combination, and the claimed combination may be directed to a sub-combination or variation of a sub-combination. Thus it is intended that the specification cover the modifications and variations of the various described embodiments provided such modification and variations come within the scope of the appended claims and their equivalents.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

It should be understood that any two quantitative values assigned to a property may constitute a range of that property, and all combinations of ranges formed from all stated quantitative values of a given property are contemplated in this disclosure.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A marine engine system comprising:
   a marine engine comprising a combustion chamber configured for burning heavy fuel oil;
   a turbocharger comprising a compressor with an air inlet and a compressed air outlet, a turbine, and a shaft coupled to the compressor and the turbine, the turbine provided in an exhaust path of exhaust gases from the marine engine such that the turbine rotates the shaft which in turn rotates the compressor;
   a separation unit comprising one or more membranes that are structurally configured to concentrate nitrogen from a separator feed stream feed to generate a nitrogen-enriched air stream and a nitrogen-depleted air stream;
   an air valve positioned in a flow path exiting the compressor, wherein the air valve is variably positionable to split flow between an intake air stream and a recovered air stream;
   a mixing chamber with an inlet in communication with the separation unit to receive the nitrogen-enriched air stream and an inlet in communication with the air valve to receive the intake air stream and an outlet in communication with the combustion chamber of the marine engine for providing a nitrogen-enriched intake air stream to the combustion chamber, wherein the nitrogen-enriched intake air stream is formed from a combination of the nitrogen-enriched air stream and the intake air stream;
   an air operated compressor positioned in a recovery flow path connecting the air valve and the separation unit to receive the recovered air stream and generate a separator feed stream, the air operated compressor configured to increase the pressure of the recovered air stream with air drawn off from the recovered air stream driving the air operated compressor; and
   an air flow controller communicatively coupled to the air valve, the air flow controller comprising a processor and a computer readable and executable instruction set, which when executed, causes the processor to:
      determine a baseline total mass air flow rate to the marine engine based on a load on the marine engine;
      determine a valve position of the air valve to split flow between the intake air stream and the recovered air stream such that the nitrogen-enriched intake air stream is provided at a target nitrogen concentration to the combustion chamber of the marine engine and at the baseline total mass air flow rate; and
      direct the air valve to adjust to the determined valve position.

2. The marine engine system of claim 1, further comprising a nitrogen concentration sensor structurally configured to detect a nitrogen content in the nitrogen-enriched intake air stream.

3. The marine engine system of claim 1, further comprising a flow sensor positioned between the separation unit and the mixing chamber to measure the flow rate of the nitrogen-enriched air stream entering the mixing chamber.

4. The marine engine system of claim 1, the system further comprising a supplemental compressor, the supplemental compressor configured to provide supplemental compressed air to the separation unit.

5. The marine engine system of claim 4, wherein the supplemental compressed air is provided to the air operated compressor.

6. The marine engine system of claim 4, wherein the supplemental compressed air is provided directly to the separation unit.

7. The marine engine system of claim 4, wherein the supplemental compressor is powered by a generator driven by exhaust energy from the marine engine.

8. The marine engine system of claim 1, where a first buffer tank is positioned between the separation unit and the mixing chamber to collect the nitrogen-enriched air stream before passage to the mixing chamber.

9. The marine engine system of claim 1, where a second buffer tank is positioned between the air operated compressor and the separation unit to collect the separator feed stream before passage to the separation unit.

10. The marine engine system of claim 1, where a third buffer tank is positioned between the air valve and the air operated compressor to collect the recovered air stream before passage to the air operated compressor.

11. The marine engine system of claim 10, further comprising a second supplemental compressor configured to provide additional supplemental compressed air, wherein a first supplemental compressor provides a first supplemental compressed air to the separation unit and the second supplemental compressor selectively provides the additional supplemental compressed air to the separation unit or the third buffer tank.

12. The marine engine system of claim 1, wherein the air operated compressor increases the pressure of the recovered air stream such that the separator feed stream has a pressure 1.5 to 2.0 times the pressure of the recovered air stream.

13. The marine engine system of claim 1, wherein the membranes of the separation unit have an 85% to 95% membrane purity.

14. The marine engine system of claim 1, wherein the compressor in the turbocharger generates excess compressed air at the compressed air outlet to account for the air drawn off from the recovered air stream to drive the air operated compressor.

15. The marine engine system of claim 1, wherein the target nitrogen concentration is at least 81.0% nitrogen by volume.

16. A method for operating a marine engine system, the method comprising:
passing air to a compressor of a turbocharger to form a compressed air stream, the turbocharger comprising the compressor, a turbine, and a shaft coupled to the compressor and the turbine, the turbine provided in an exhaust path of exhaust gases from a marine engine such that the turbine rotates the shaft which in turn rotates the compressor;
splitting the compressed air stream exiting the compressor with an air valve positioned in a flow path exiting the compressor, wherein the air valve is variably positionable to split flow between an intake air stream directed to a mixing chamber and a recovered air stream directed to a separation unit;
passing the recovered air stream to an air operated compressor positioned in a recovery flow path connecting the air valve and the separation unit to generate a separator feed stream, the air operated compressor configured to increase the pressure of the air in the recovered air stream with air drawn off from the recovered air stream driving the air operated compressor;
separating the separator feed stream in the separation unit into a nitrogen-enriched air stream and a nitrogen-depleted air stream, wherein the separation unit comprises one or more membranes that are structurally configured to generate the nitrogen-enriched air stream having a greater nitrogen concentration than that of the separator feed stream;
passing the intake air stream to the mixing chamber;
passing the nitrogen-enriched air stream to the mixing chamber;
mixing the intake air stream and the nitrogen-enriched air stream within the mixing chamber to generate a nitrogen-enriched intake air stream;
determining a baseline total mass air flow rate to the marine engine based on a load on the marine engine;
adjusting the air valve to adjust the split between the intake air stream and the recovered air stream such that the nitrogen-enriched intake air stream is provided at a target nitrogen concentration and at the baseline total mass air flow rate to a combustion chamber of the marine engine;
passing a heavy fuel oil to the combustion chamber; and
combusting the heavy fuel oil and the nitrogen-enriched intake air stream within the combustion chamber, thereby moving a piston within the combustion chamber.

17. The method of claim 16, further comprising detecting a nitrogen content within the nitrogen-enriched intake air stream and based at least in part on the detected nitrogen content within the nitrogen-enriched intake air stream, adjusting the air valve to adjust the split between the intake air stream and the recovered air stream such that a nitrogen content of the nitrogen-enriched intake air stream is adjusted to a desired level.

18. The method of claim 16, further comprising providing supplemental compressed air to the separation unit from a supplemental compressor.

19. The method of claim 18, wherein the supplemental compressed air is provided to the air operated compressor.

20. The method of claim 18, wherein the supplemental compressed air is provided directly to the separation unit.

21. The method of claim 16, wherein the target nitrogen concentration is 78.0 to 79.0% nitrogen by volume when the marine engine system is operated outside an Emission Control Area.

* * * * *